(12) United States Patent
Kwon et al.

(10) Patent No.: US 10,714,800 B2
(45) Date of Patent: Jul. 14, 2020

(54) ELECTROLYTIC ADDITIVE, ELECTROLYTE INCLUDING THE ELECTROLYTIC ADDITIVE, CATHODE INCLUDING THE ELECTROLYTE, AND LITHIUM AIR BATTERY INCLUDING THE CATHODE

(71) Applicants: Samsung Electronics Co., Ltd., Suwon-si, Gyeonggi-do (KR); Seoul National University R&DB Foundation, Seoul (KR)

(72) Inventors: Hyukjae Kwon, Suwon-si (KR); Kisuk Kang, Seoul (KR); Youngjoon Bae, Seoul (KR); Dongjoon Lee, Suwon-si (KR); Hyunjin Kim, Seoul (KR); Hyunpyo Lee, Seoul (KR); Dongmin Im, Seoul (KR)

(73) Assignees: SAMSUNG ELECTRONICS CO., LTD., Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/167,935

(22) Filed: Oct. 23, 2018

(65) Prior Publication Data
US 2019/0319322 A1    Oct. 17, 2019

(30) Foreign Application Priority Data
Apr. 13, 2018  (KR) .................... 10-2018-0043568

(51) Int. Cl.
*H01M 8/22* (2006.01)
*H01M 12/06* (2006.01)
(Continued)

(52) U.S. Cl.
CPC ........... *H01M 12/06* (2013.01); *H01M 4/382* (2013.01); *H01M 4/604* (2013.01); *H01M 10/0567* (2013.01); *H01M 2300/0028* (2013.01)

(58) Field of Classification Search
CPC ...... H01M 12/06; H01M 4/382; H01M 4/604; H01M 10/0567; H01M 2300/0028
See application file for complete search history.

(56) References Cited

U.S. PATENT DOCUMENTS 7,642,011 B2   1/2010   Nakahara et al.
2015/0125344 A1*  5/2015   Kanno ................ A23L 3/3454
                                                         422/29

FOREIGN PATENT DOCUMENTS

JP   1998154531 A   6/1998
JP   1998162809 A   6/1998
(Continued)

OTHER PUBLICATIONS

Bae et al., "Enhanced Stability of Coated Carbon Electrode for Li-O2 Batteries and Its Limitations", Advanced Energy Materials, 8, 2018, pp. 1702661 (1 of 9)—1702661 (9 of 9).
(Continued)

*Primary Examiner* — Jane J Rhee
(74) *Attorney, Agent, or Firm* — Cantor Colburn LLP

(57) ABSTRACT

An electrolytic additive including a compound represented by Formula 1:
(Continued)

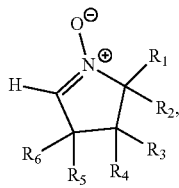

Formula 1 wherein, in Formula 1, $R_1$ and $R_2$ are each independently hydrogen or a substituted or unsubstituted $C_1$-$C_{20}$ aliphatic hydrocarbon group, and at least one of $R_1$ and $R_2$ is a substituted or unsubstituted $C_2$-$C_{20}$ alkyl group, and $R_3$ to $R_6$ are each independently hydrogen, a substituted or unsubstituted $C_1$-$C_{20}$ alkyl group, or a substituted or unsubstituted $C_5$-$C_{20}$ cycloalkyl group.

20 Claims, 7 Drawing Sheets

(51) Int. Cl.
 H01M 4/38 (2006.01)
 H01M 4/60 (2006.01)
 H01M 10/0567 (2010.01)

(56) References Cited

FOREIGN PATENT DOCUMENTS

JP 2004207249 A 7/2004
JP 2010140821 A 6/2010

OTHER PUBLICATIONS

Bae et al., "Tuning the Carbon Crystalinity for Highly Stable Li-O2 Batteries", American Chemical Society, 28, 2016, pp. 8160-8169.
Castelhano et al., "Do spin-adducts of 5, 5-dimethylpyrroline-N-oxide dimerize?", Division of Chemistry, National Research Council of Canada, 1981, pp. 1501-1503.
Zhang et al., "ESR Evidence for the Stereospecific Spin Trapping of 5-Alkyl-5-Methyl-1-Pyrroline N-oxides", Magnetic Resonance in Chemistry, vol. 27, 1989, pp. 846-851.

* cited by examiner

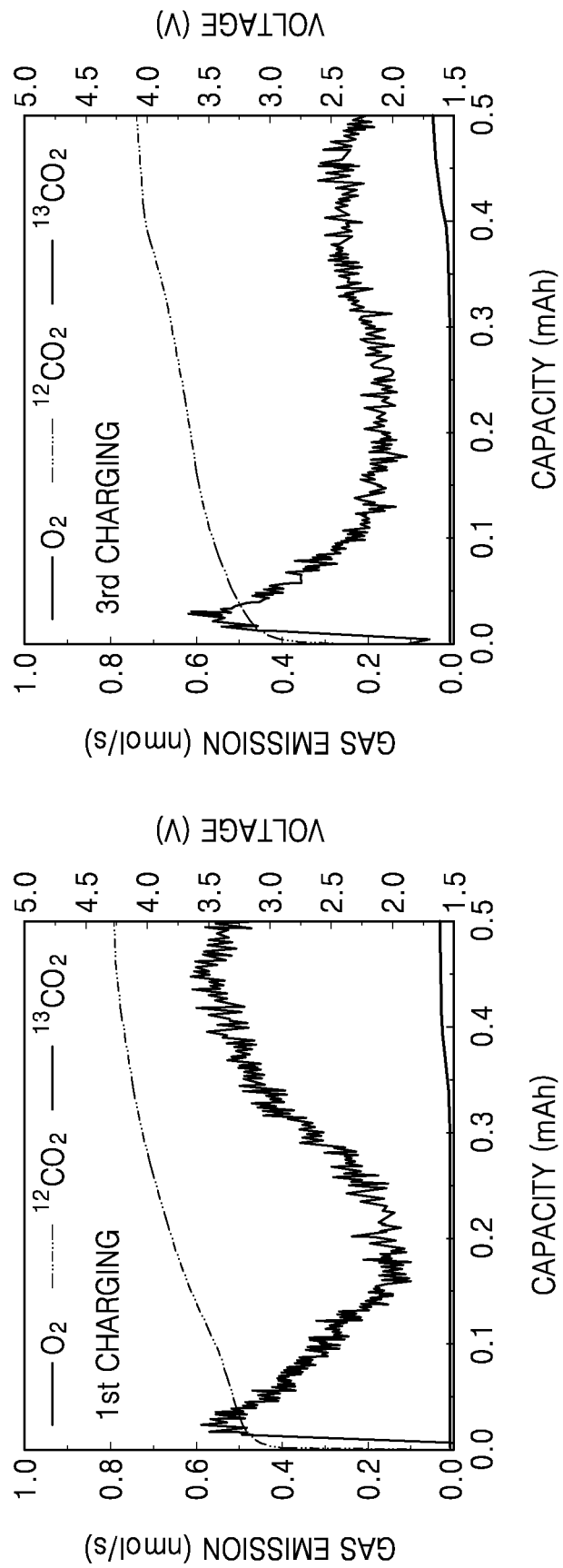

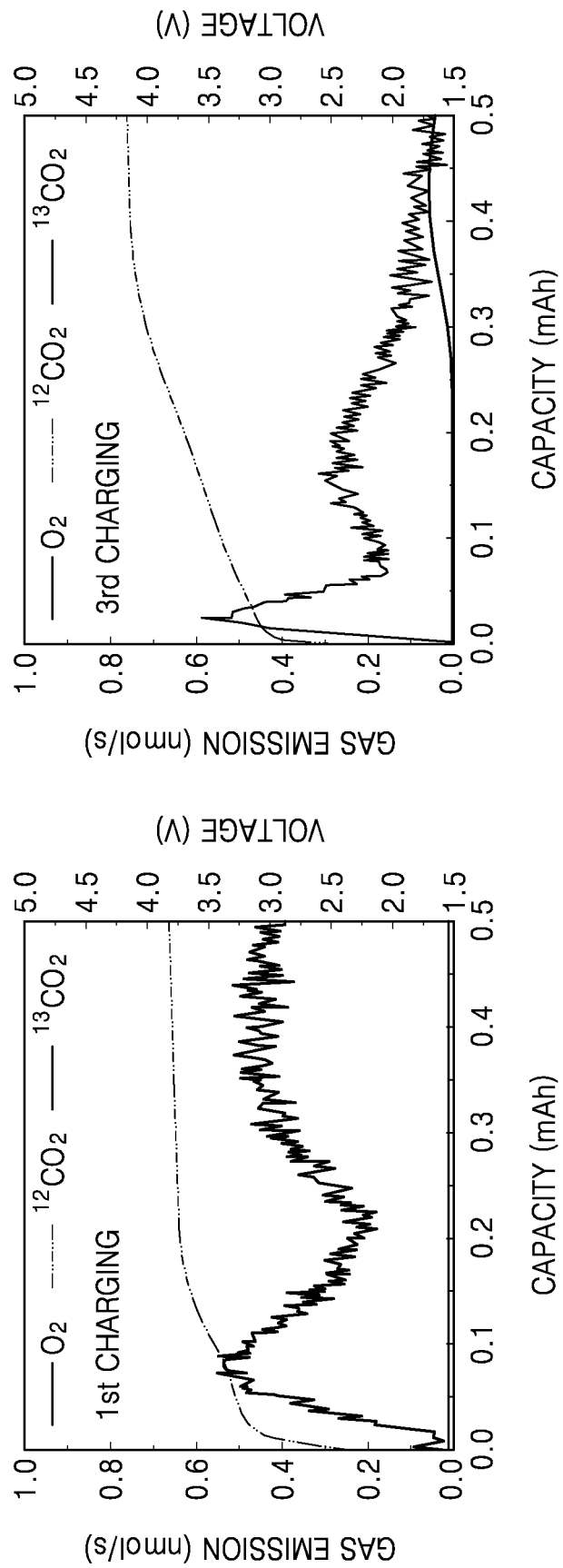

ELECTROLYTIC ADDITIVE, ELECTROLYTE INCLUDING THE ELECTROLYTIC ADDITIVE, CATHODE INCLUDING THE ELECTROLYTE, AND LITHIUM AIR BATTERY INCLUDING THE CATHODE

CROSS-REFERENCE TO RELATED APPLICATION

This application claims priority to and the benefit of Korean Patent Application No. 10-2018-0043568, filed on Apr. 13, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to an electrolytic additive, an electrolyte including the electrolytic additive, a cathode including the electrolyte, and a lithium air battery including the cathode.

2. Description of the Related Art

Lithium air batteries include an anode that incorporates and deincorporates alkali metal ions, a cathode that oxidizes/reduces oxygen in air, and a lithium ion-conductive medium between the cathode and the anode.

Such lithium air batteries can be manufactured as high-capacity batteries since lithium is used as an anode and there is no need to store air used as a cathode active material inside the batteries. The theoretical specific energy of lithium is 3,500 watt-hours per kilogram (Wh/kg). Thus, the theoretical energy density of a lithium air battery is approximately 10 times that of a lithium ion battery.

However, there remains a need for a lithium air battery having an improved lifespan.

SUMMARY

Provided is an electrolytic additive, including a nitroso compound.

Provided is an electrolyte including the electrolytic additive.

Provided is a cathode including the electrolyte.

Provided is a lithium air battery including the cathode.

Additional aspects will be set forth in part in the description which follows and, in part, will be apparent from the description, or may be learned by practice of the presented embodiments.

According to an embodiment, an electrolytic additive includes a compound represented by Formula 1:

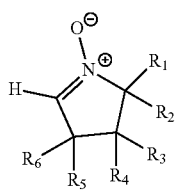

Formula 1 wherein, in Formula 1, $R_1$ and $R_2$ are each independently hydrogen or a substituted or unsubstituted $C_1$-$C_{20}$ aliphatic hydrocarbon group, and at least one of $R_1$ and $R_2$ is a substituted or unsubstituted $C_5$-$C_{20}$ alkyl group, and $R_3$ to $R_6$ are each independently hydrogen, a substituted or unsubstituted $C_1$-$C_{20}$ alkyl group, or a substituted or unsubstituted $C_5$-$C_{20}$ cycloalkyl group.

In an aspect, an electrolytic solution for a secondary battery includes: a lithium salt; a solvent comprising an organic solvent, an ionic liquid, or a combination thereof; and the electrolytic additive.

According to an embodiment, an electrolyte for a secondary battery includes: a lithium salt; a solvent including at least one of an organic solvent and an ionic liquid; and the electrolytic additive.

According to an embodiment, a cathode includes the electrolytic additive.

According to an embodiment, a lithium air battery includes the cathode, and an anode.

BRIEF DESCRIPTION OF THE DRAWINGS

These and/or other aspects will become apparent and more readily appreciated from the following description of the embodiments, taken in conjunction with the accompanying drawings in which:

FIGS. 4A and 4B are graphs of gas emission (nanomoles per second (nmol/s)) and voltage (V) versus capacity (milliampere hours (mAh)) showing the amount of $CO_2$ gas produced on the first and third charge cycles for the lithium air battery of Example 1;

FIGS. 6A and 6B are graphs of gas emission (nmol/s) and voltage (V) versus capacity (mAh) showing the amount of $CO_2$ gas produced on the first and third charge cycles for the lithium air battery of Comparative Example 2.

DETAILED DESCRIPTION

Figure 1:
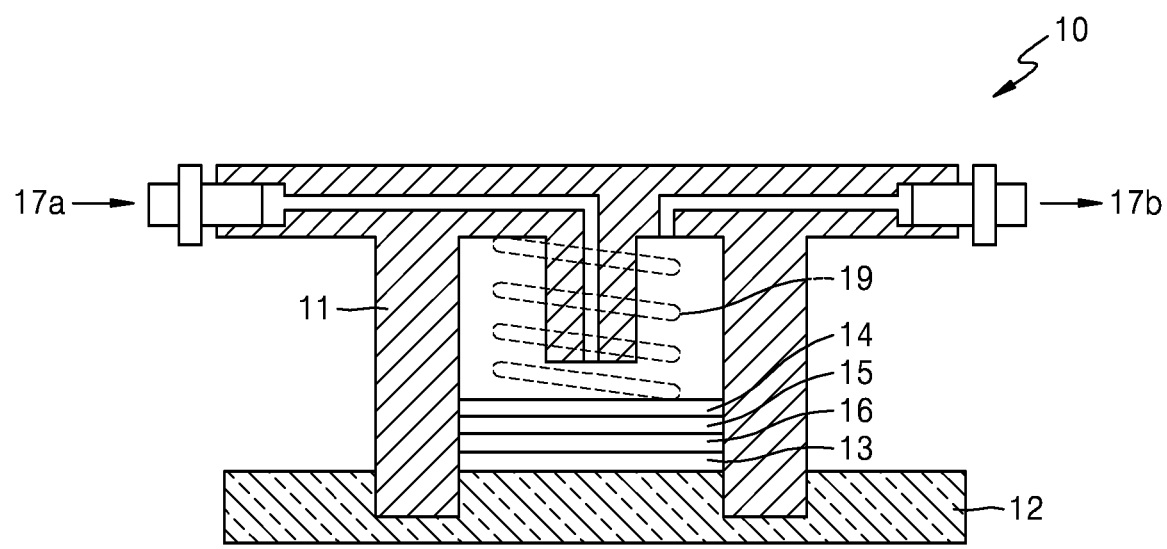
FIG. 1 is a schematic view of an embodiment of a lithium air battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Lithium air batteries use air as a cathode active material. While not wanting to be bound by theory, it is understood that oxygen radicals are generated as a reaction product inside a cathode and a cathode electrolyte during discharge and charge. Oxygen radicals are understood to oxidize an electrolyte, or carbon used as a material for a cathode, to irreversibly form a carbonate product, reducing the lifespan of the lithium air battery. Accordingly, desired is a method of preventing the lifespan deterioration of lithium air batteries caused by oxygen radicals.

Hereinafter, an electrolytic additive according to example embodiments, an electrolyte including the electrolytic additive according to example embodiments, a cathode including the electrolytic additive according to example embodiments, and a lithium air battery including the cathode and an anode according to example embodiments will be described in detail.

The term "aliphatic hydrocarbon" used herein refers to a group including carbon and hydrogen. For example, an aliphatic hydrocarbon includes a straight chain, a branched chain, and cyclic hydrocarbon rings. In addition, aliphatic hydrocarbons include saturated hydrocarbon and unsaturated hydrocarbon. The aliphatic hydrocarbon may be substituted or unsubstituted. A substituent of the substituted aliphatic hydrocarbon may be hydrogen, —F, —Cl, —Br, —I, a hydroxyl group, a cyano group, a nitro group, an amidino group, a hydrazino group, a hydrazino group, a $C_1$-$C_{60}$ alkyl group, a $C_2$-$C_{60}$ alkenyl group, a $C_2$-$C_{60}$ alkynyl group, or a $C_1$-$C_{60}$ alkoxy group.

The term "$C_a$-$C_b$" used herein refers to a carbon number of a particular functional group. That is, the functional group may include carbon atoms in the number of a to b. For example, a "$C_1$-$C_4$ alkyl group" refers to an alkyl group having one carbon atom to four carbon atoms, and examples thereof are —$CH_3$, —$CH_2CH_3$, —$CH_2CH_3CH_3$, —$CH(CH_3)_2$, —$CH_2CH_3CH_3CH_3$, —$CH(CH_3)CH_2CH_3$, and —$C(CH_3)_3$.

The term "alkyl group" used herein refers to a branched or non-branched aliphatic hydrocarbon. In one embodiment, the alkyl group may be unsubstituted or substituted. Examples of the alkyl group are a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group, but the alkyl group is not limited thereto. These alkyl groups may each be optionally substituted or unsubstituted. The substituent of the substituted alkyl group may be the same as explained in connection with the substituents for the aliphatic hydrocarbon.

The term "cycloalkyl group" used herein refers to a fully saturated carbocyclic ring or ring system. For example, the cycloalkyl group may be a cyclopropyl group, a cyclobutyl group, a cyclopentyl group, or a cyclohexyl group. In one embodiment, the cycloalkyl group may be unsubstituted or substituted. The substituent of the substituted cycloalkyl group may be the same as explained in connection with the substituents for the aliphatic hydrocarbon.

The term "alkoxy" used herein refers to an alkyl group that is linked via an oxygen (i.e., alkyl-O—), for example methoxy, ethoxy, and sec-butyloxy groups.

The term "alkenyl" used herein refers to a straight or branched chain, monovalent hydrocarbon group having at least one carbon-carbon double bond (e.g., ethenyl (—HC=CH$_2$)).

The term "alkynyl" used herein refers to a straight or branched chain, monovalent hydrocarbon group having at least one carbon-carbon triple bond (e.g., ethynyl (—HC≡CH)).

The electrolytic additive according to an embodiment includes the compound represented by Formula 1:

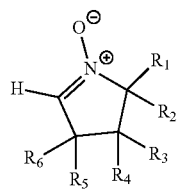

Formula 1

In Formula 1, $R_1$ and $R_2$ are each independently hydrogen or a substituted or unsubstituted $C_1$-$C_{20}$ aliphatic hydrocarbon group, and at least one of $R_1$ and $R_2$ is a substituted or unsubstituted $C_2$-$C_{20}$ alkyl group, and $R_3$ to $R_6$ are each independently hydrogen, a substituted or unsubstituted $C_1$-$C_{20}$ alkyl group, or a substituted or unsubstituted $C_5$-$C_{20}$ cycloalkyl group.

According to an embodiment, $R_1$ may be a methyl group, an ethyl group, a propyl group, an isopropyl group, an n-butyl group, an isobutyl group, a tert-butyl group, or a sec-butyl group, and $R_2$ may be a substituted or unsubstituted $C_2$-$C_{20}$ alkyl group.

According to an embodiment, $R_2$ may be a substituted or unsubstituted $C_5$-$C_{20}$ alkyl group.

For example, $R_2$ may be an n-pentyl group, a tert-pentyl group, a neo-pentyl group, an iso-pentyl group, a sec-pentyl group, a 3-pentyl group, a sec-isopentyl group, an active-pentyl group, a hexyl group, a heptyl group, a octyl group, a nonyl group, a decyl group, a undecyl group, a dodecyl group, a tridecyl group, a tetradecyl group, a pentadecyl group, a hexadecyl group, a heptadecyl group, a oxathecyl group, a nonadecyl group, or an eicosyl group, but is not limited thereto.

In an embodiment, $R_3$ to $R_6$ may each independently be hydrogen or a substituted or unsubstituted $C_1$-$C_{20}$ alkyl group.

For example, $R_3$ to $R_6$ may each be hydrogen.

The compound represented by Formula 1 may have a boiling point of 60° C. or greater.

In an embodiment, $R_1$ may be a methyl group, and $R_2$ may be a substituted or unsubstituted $C_5$-$C_{20}$ alkyl group, and the boiling point of the compound represented by Formula 1 may be 100° C. or greater.

Formula 1 may be represented by Formula 1-1:

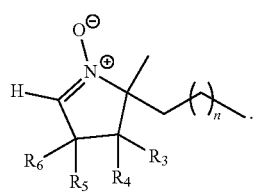

Formula 1-1

In Formula 1-1, $R_3$ to $R_6$ are the same as described above, and n may be an integer from 3 to 18.

The compound represented by Formula 1 may be (CH$_3$)(CH$_3$CH$_2$CH$_2$CH$_2$CH$_2$)(C$_4$H$_5$)NO, (CH$_3$)(CH$_3$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$CH$_2$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$CH$_2$CH$_2$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$CH$_2$CH$_2$CH$_2$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$)(C$_4$H$_5$)N O, (CH$_3$)(CH$_3$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$)(C$_4$H$_5$)NO, (CH$_3$)(CH$_3$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$) (C$_4$H$_5$)NO, (CH$_3$)(CH$_3$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$)(C$_4$H$_5$)NO, or (CH$_3$)(CH$_3$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$CH$_2$)(C$_4$H$_5$)NO.

While not wanting to be bound by theory, is understood that the compound represented by Formula 1 may react with an oxygen radical to form a stable compound. The compound represented by Formula 1 may capture an oxygen radical since carbon in N=C in Formula 1 forms a covalent bond with the non-covalent electrons of an oxygen radical molecule.

For example, in the case of a lithium air battery, during discharge, at a cathode, external oxygen reacts with lithium ions that are derived from an anode that has experienced a reduction reaction, thereby forming a lithium oxide (Li$_2$O$_2$). During charge, an oxidation reaction proceeds with respect to the lithium oxide to produce oxygen while lithium ions flow towards an anode, thereby being electrodeposited as metal lithium. Oxygen that is externally provided from the outside during discharge or oxygen that is produced during charge is reduced to form radicals, and such oxygen radicals may react with carbon constituting the surface of the cathode, or react with a carbon source included in an electrolytic solution to form carbonate (CO$_3$) at the surface of the cathode. Accordingly, during charge, carbon dioxide (CO$_2$) is produced. Since the compound represented by Formula 1 captures an oxygen radical, when the compound is used as the electrolytic additive for a lithium air battery, the side-reaction caused due to the oxygen radicals produced at the cathode may be suppressed.

In some embodiments, since the compound represented by Formula 1 has at least one $C_5$-$C_{20}$ alkyl group as a substituent, the boiling point of the compound is 60° C. or higher. Accordingly, during the charging and discharging cycle of a lithium air battery that is performed at a temperature of 60° C. or greater, the compound may not decompose but function as a radical stabilizer.

In an embodiment, provided is an electrolyte for a secondary battery, the electrolyte including: a lithium salt; at least one of an organic solvent and an ionic liquid; and the electrolytic additive described above.

The lithium salt may be dissolved in the organic solvent or the ionic liquid, and may function as a supply source of lithium ions in a battery, and may promote, for example, the flow of lithium ions between a cathode and an anode.

The lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein each of x and y is a natural number), LiCl, LiI, or a combination thereof, but is not limited thereto. For example, the lithium salt may be any suitable lithium salt.

The concentration of the lithium salt may be in the range of about 0.01 molar (M) to about 2M, but it is not limited thereto. The concentration may vary according to purpose. Within the concentration range, a battery may obtain improved characteristics.

The organic solvent may include an ether solvent, a carbonate solvent, an ester solvent, a ketone solvent, or a combination thereof.

In an embodiment, the ether solvent may be a non-cyclic ether or a cyclic ether.

For example, the non-cyclic ether may include 1,2-dimethoxyethane, 1,2-diethoxyethane, 1,2-dibutoxyethane, dimethylether, diethylether, dibutylether, diethylene glycol dimethyl ether, diethylene glycol diethyl ether, triethylene glycol dimethyl ether, triethylene glycol diethyl ether, tetraethylene glycol dimethyl ether, tetraethylene glycol diethyl ether, dimethyl sulfoxide, or N,N-dimethyl acetamide, but is not limited thereto. The non-cyclic ether may be any suitable linear or branched organic compound that includes an ether group.

For example, the cyclic ether may include 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyl tetrahydrofuran, 2,5-dimethyl tetrahydrofuran, 2,5-dimethoxy tetrahydrofuran, 2-ethoxy tetrahydrofuran, 2-methoxy-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, or isosorbide dimethyl ether, but is not limited thereto. The cyclic ether may be any suitable cyclic organic compound that includes an ether group.

The carbonate solvent may include, for example, dimethyl carbonate ("DMC"), diethyl carbonate ("DEC"), ethylmethyl carbonate ("EMC"), dipropyl carbonate ("DPC"), methylpropyl carbonate ("MPC"), ethylpropyl carbonate ("EPC"), methylethyl carbonate ("MEC"), ethylene carbonate ("EC"), propylene carbonate ("PC"), or butylene carbonate ("BC").

The ester solvent may include, for example, methyl acetate, ethyl acetate, n-propyl acetate, dimethyl acetate, methyl propionate, ethyl propionate, γ-butyrolactone, decanolide, valerolactone, mevalonolactone, or caprolactone.

The ketone solvent may include, for example, cyclohexanone.

The ionic liquid may be a salt formed by combining at least one cation, for example, an ammonium cation, an imidazolium cation, a piperidinium cation, a pyridinium, pyrrolidinium cation, a phosphonium cation, or a sulfonium cation, and at least one anion, for example, a bis(trifluoromethylsulfonyl)imide-based anion, a bromide-based anion, a chloride-based anion, a dicyanamide-based anion, a hexafluorophosphate-based anion, a phosphate-based anion, a sulfate-based anion, an iodide-based anion, a sulfonate-based anion, a nitrate-based anion, a tetrafluoroborate-based anion, a thiocyanate-based anion, or a triflate-based anion.

For example, the ionic liquid may include 1-ethyl-3-methylimidazolium bis(trifluoromethylsulfonyl)imide ("EMI-TFSI"), diethylmethylammonium trifluoromethanesulfonate ("[dema][TfO]"), dimethylpropylammonium trifluoromethanesulfonate ("[dmpa][TfO]"), diethylmethylammonium trifluoromethanesulfonylimide ("[dema][TFSI]"), methylpropylpiperidinium trifluoromethanesulfonylimide ("[mpp][TFSI]"), or a combination thereof, but is not limited thereto. For example, the ionic liquid may be any suitable material that has lithium-ion conductivity and may be used as an electrolyte for a lithium air battery.

The electrolytic additive may be included in a concentration of about 0.1M to about 1M in an electrolyte. When the concentration of the electrolytic additive is within this range, oxygen radicals generated at the surface of a cathode are sufficiently captured to reduce the amount of $CO_2$ generated due to the side reaction.

An aspect of the disclosure provides a cathode including the electrolytic additive.

In an embodiment, the cathode may include a porous material. The porous material may include a porous carbon-based material, a porous carbon structure formed by heat-treating a carbon-based material, or a combination thereof. For example, the carbon-based material may include carbon black, graphite, graphene, activated carbon, or carbon fiber. For example, the carbon-based material may include carbon nanoparticles, carbon nanotubes, carbon nanofibers, carbon nanosheets, carbon nanorods, carbon nanotubes, or a combination thereof, but is not limited thereto. The carbon-based material may be any suitable carbon-based material that has a nano structure. The carbon-based material may include, in addition to the nanostructure, a microstructure. For example, the carbon-based material may have a shape having a micro size. The carbon-based material may have the shape of a particle, a tube, a fiber, a sheet, a rod, a belt, or the like. For example, the carbon-based material may be a mesoporous carbon-based material having a meso pore.

Since the cathode includes the porous carbon-based material, pores of the cathode may effectively tolerate the volumetric change of the cathode caused by a discharge product during charge and discharge. Also, since the carbon-based material has porosity, the contact area thereof with respect to an electrolyte is increased, leading to high-rate characteristics during charge and discharge. Also, the increased surface area of the cathode may allow oxygen to be easily supplied to and diffuse into the cathode, and provide a sufficient space to which the product generated during charge and discharge may adhere.

In an embodiment, the cathode includes a porous material and an electrolyte layer including an electrolytic solution for a cathode, and the electrolytic solution may include an electrolytic additive. The electrolyte layer including the electrolytic solution for a cathode refers to an electrolyte layer located adjacent to the cathode.

In an embodiment, an electrolytic solution for a cathode included in the electrolyte layer may include the electrolytic solution described above. In an embodiment, the electrolyte layer may include a separator impregnated with the electrolytic solution described above. The separator may have any suitable composition as long as the separator is available for the usage range of a lithium air battery. For example, the separator may be a non-woven polymer fabric, such as a non-woven polypropylene fabric or a non-woven polyphenylene sulfide fabric; a porous film of an olefin-based resin, such as polyethylene or polypropylene, glass fiber; or a combination of these.

The electrolytic additive may be included in a concentration of about 0.1 molar (M) to about 1M in the electrolytic solution for a cathode. Since the electrolytic additive has this concentration range, radicals generated at the cathode may be efficiently removed, and may not act as a resistance against the delivery of lithium ions.

In an embodiment, the cathode includes a porous material and a coating layer positioned on the porous material, and the coating layer may include the electrolytic additive. The coating layer may include a binder. The binder may be any suitable binder.

The coating layer may be provided by using a coating method of the related art. For example, the coating layer may be provided by a dry coating process or a wet coating process. Examples of the dry coating process are a chemical vapor deposition ("CVD") and an ion beam sputtering, and examples of the wet coating process are a gravure coating, a microgravure coating, a capillary coating, and a bar coating.

The cathode includes a porous carbon-based material and a coating layer includes an electrolytic additive positioned on the carbon-based material, and the weight ratio of the porous carbon-based material to the coating layer may be in the range of 1:2 to 1:5. For example, the weight ratio of the carbon-based material to the coating layer may be in the range of 1:2 to 1:4.5, 1:2 to 1:4, 1:2 to 1:3.5, 1:2 to 1:3, 1:2.5 to 1:5, 1:3 to 1:5, 1:3.5 to 1:5, or 1:4 to 1:5.

In an embodiment, the cathode includes a porous material, a coating layer positioned on the porous material, and an electrolyte layer including an electrolytic solution for a cathode. In an embodiment, the coating layer may be provided on a surface of the porous material, and the electrolyte layer may be provided being adjacent to an opposite surface thereof facing the coating layer. In an embodiment, the electrolytic additive may be included in at least one of the coating layer and the electrolyte layer. For example, the electrolytic additive may be included in the coating layer alone. In this case, the electrolyte layer may include an electrolyte that is used in a lithium secondary battery of the related art. For example, the coating layer and the electrolyte layer may each include the electrolytic additive at the same time. In this case, the effects of capturing oxygen radicals are improved, and thus, the amount of $CO_3$ generated due to the side reaction at the interface of the cathode may be reduced.

An aspect provides a lithium air battery including the cathode and an anode.

For example, the lithium air battery may have a reaction mechanism represented by Reaction Scheme 1.

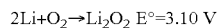                     Reaction Scheme 1

During discharge, lithium introduced by the anode is combined with oxygen introduced by the cathode to produce lithium oxide and the oxygen is reduced (oxygen reduction reaction ("ORR")). During charge, the lithium oxide is reduced and oxygen is oxidized. During discharge, $Li_2O_2$ precipitates in the pores of the cathode, and the capacity of a lithium air battery is increased as the contact area of an electrolyte with respect to oxygen in the cathode is increased.

In an embodiment, the cathode has a surface contacting a current collector. The current collector may have a porous structure having a net shape or a mesh shape to promote diffusion of oxygen, and may be a porous metal plate formed of, stainless steel, nickel, or aluminum. However, the material for the current collector is not limited thereto, and may be any suitable material that may be used in a current collector. The current collector may be coated with an oxidation-resistant metal coating or an oxidation-resistant alloy coating to prevent oxidation.

A gas diffusion layer may be additionally arranged between the current collector and the cathode. The gas diffusion layer may include a porous carbon-based material, a porous metal, or the like. However, the material therefor is not limited thereto. The gas diffusion layer may be any suitable material that may be used in a conductive gas diffusion layer. For example, the porous carbon-based material may be a non-woven carbon fabric or the like. The conductive gas diffusion layer has a density that is less than metal. Accordingly, the conductive gas diffusion layer may improve the energy density of a lithium air battery.

In an embodiment, the anode may be a lithium metal thin film or a lithium-based alloy thin film. A lithium metal-based alloy may be, for example, an alloy of lithium and aluminum, tin, magnesium, indium, calcium, titanium, vanadium, or a combination thereof.

In an embodiment, an oxygen-blocking film may be additionally arranged between the cathode and the anode. The oxygen-blocking film may be impervious with respect to oxygen. The oxygen-blocking film is a lithium ion-conductive solid electrolyte membrane, and may act as a protective film that prevents a direct reaction between impurities including oxygen included in the electrolyte layer and a lithium-metal anode.

The lithium ion-conductive solid electrolyte membrane, which is impervious to oxygen, may be a lithium ion-conductive glass, a lithium ion-conductive crystal (ceramic or glass-ceramic), or an inorganic material including a mixture thereof, but is not limited thereto. The material for the lithium ion-conductive solid electrolyte membrane may be any suitable solid electrolyte membrane that is impervious with respect to oxygen and protects an anode. In consideration of, e.g., to provide, chemical stability, an example of the lithium ion-conductive solid electrolyte membrane is an oxide membrane When the lithium ion-conductive solid electrolyte membrane includes many lithium ion-conductive crystals, high ion conductivity may be obtained. Accordingly, the amount of lithium ion-conductive crystals may be, based on the total weight of the solid electrolyte membrane, for example, 50 weight percent (wt %) or greater, 55 wt % or greater, or 55 wt % or greater.

Lithium ion conductivity crystals may be, for example, a perovskite structure crystal having lithium ion conductivity, such as $Li_3N$, LISICON, e.g., $Li_{2+2x}Zn_{1-x}GeO_4$, or $La_{0.55}Li_{0.35}TiO_3$; $LiTi_2P_3O_{12}$ having a NASICON-type structure, e.g., $Na_{1+x}Zr_2Si_xP_{3-x}O_{12}$, wherein $0<x<3$; or a glass-ceramic that precipitates these crystals.

Lithium ion conductivity crystals may be, for example, $Li_{1+x+y}(Al,Ga)_x(Ti,Ge)_{2-x}Si_yP_{3-y}O_{12}$, wherein $0\leq x\leq 1$ and $0\leq y\leq 1$, for example, $0\leq x\leq 0.4$ and $0<y\leq 0.6$, or $0.1\leq x\leq 0.3$ and $0.1<y\leq 0.4$. To have high ion conductivity, lithium ion conductivity crystals may not have the grain boundary that interrupts ion-conduction. For example, the glass-ceramic does not have pores or grain boundaries which interrupt ion conduction, and thus, the glass-ceramic has high ion conductivity and excellent chemical stability.

The glass-ceramic, which is lithium ion conductive, may be, for example, lithium-aluminum-germanium-phosphate ("LAGP"), lithium-aluminum-titanium-phosphate ("LATP"), or lithium-aluminum-titanium-silicon-phosphate ("LATSP").

For example, when a mother glass has the composition of $Li_2O$—$Al_2O_3$—$TiO_2$—$SiO_2$—$P_2O_5$ and the mother glass is crystallized by a heat treatment, a main crystal phase is $Li_{1+x+y}Al_xTi_{2-x}Si_yP_{3-y}O_{12}$ (0≤x≤1 and 0≤y≤1) wherein x and y may satisfy the conditions of, for example, 0≤x≤0.4, or 0<y≤0.6, or 0.1≤x≤0.3 and 0.1<y≤0.4.

The pore or grain boundary that interrupts ion conduction refers to an ion conductive inhibiting material, such as a pore or grain boundary, that reduces the conductivity of an inorganic material including lithium ion-conductive crystals to 10% or less of the conductivity of the lithium ion-conductive crystals in the inorganic material.

For example, the oxygen-blocking film may include $Li_{1+x+y}Al_xTi_{2-x}Si_yP_{3-y}O_{12}$ (0≤x≤1, 0≤y≤1). Herein, x and y may satisfy the conditions of, for example, 0≤x≤0.4, or 0<y≤0.6, or 0.1≤x≤0.3 and 0.1<y≤0.4. For example, the oxygen-blocking film may include $Li_{1+x+y}Al_x(Ti,Ge)_{2-x}Si_yP_{3-y}O_1$, wherein 0≤x≤2 and 0≤y≤3. An example of the oxygen-blocking film is a solid electrolyte membrane including $Li_{1.4}Ti_{1.6}Al_{0.4}P_3O_{12}$ ("LATP").

When a liquid electrolyte is used, the oxygen-blocking film may be replaced with a thick glass wool impregnated with a liquid electrolyte to block oxygen. In an experiment that is performed to identify characteristics of a liquid electrolyte, the glass wool may be used instead of an oxygen-blocking film.

The lithium-air battery may be applied to a lithium primary battery and a lithium secondary battery. The shape of the lithium air battery is not limited, and may have, for example, a coin shape, a button shape, a sheet shape, a stack shape, a cylindrical shape, a flat type, or a cone shape. The lithium battery may be applied to large batteries used in electric vehicles.

FIG. 1 shows a schematic view of a lithium air battery 10. The lithium air battery 10 includes a cathode 15 contacting a first current collector 14 and which uses oxygen as an active material, an anode 13 contacting a second current collector 12 and which includes lithium, and an electrolyte membrane 16 adjacent to the anode 13 that includes lithium. An anode interlayer may be additionally arranged between the anode 13 and the electrolyte membrane 16. The cathode 15 may have a multi-layered structure including a first cathode layer and a second cathode layer.

The first current collector 14 is porous, and thus, may act as a gas diffusion layer that allows air to diffuse therethrough. Porous carbon paper may be additionally arranged as the gas diffusion layer between the first current collector 14 and the cathode 15. A pressing element 19 may be arranged on the first current collector 14 to allow air to be delivered to an air electrode.

A case 11 may be arranged surrounding the cathode 15 and the anode 13 to electrically separate the cathode 15 from the anode 13. The case 11 may include an insulating resin. Air is supplied from an air inlet 17a and discharged to an air outlet 17b. A lithium air battery may be placed in a stainless steel reactor.

The term "air" used herein is not limited to an atmospheric air, and may include a gas combination including oxygen or pure oxygen gas. This definition of the term "air" may be applied to various applications, for example, an air battery, an air electrode, or the like.

In the case of a lithium air battery, due to the deterioration of a cathode at a high temperature of 60° C. or greater, gas, such as carbon dioxide, may be generated and the cycle of charging and discharging reaches only about 100 cycles, e.g., the lithium air battery may perform effectively for only about 100 cycles of charging and discharging. In the case of a lithium air battery according to an embodiment, the lithium air battery may operate at a temperature of 60° C. or greater (that is, high temperature) during 140 or more cycles of charging and discharging, e.g., the lithium air battery according to an embodiment may perform effectively for 140 or more cycles of charging and discharging. That is, since the electrolytic additive represented by Formula 1 is included in an electrolytic solution or a cathode coating layer, the deterioration of a cathode may be suppressed. Effective performance may include having a discharge capacity of 1,000 milliampere hours per gram of carbon when discharged to 2.0 V (versus Li) at a constant current of 0.1 milliamperes per square centimeter in a 1 atmosphere oxygen atmosphere at a temperature of 60° C. or higher and charged to 4.2 V with a same current.

The present disclosure will be explained in more detail in the following Examples and Comparative Examples. However, Examples are provided herein for illustrative purpose only, and do not limit the scope of the present disclosure.

EXAMPLES

Preparation of Electrolytic Additive

Preparation Example 1: Preparation of Compound 1

2-methyl-1-pyrroline N-oxide ("MPO") and $CH_3(CH_2)_{12}$ MgBr-$Et_2O$ were added to an agitator and a reaction was performed at a temperature of 35° C. Thereafter, an ammonium chloride aqueous solution (1 milliliter (ml)) was added to the obtained product and stirred. Subsequently, ether was removed from a reaction product by distillation. The resulting residue was dissolved in methanol (40 ml), and $CuCl_2$ was added thereto to perform copper catalyzed air oxidation at a temperature of 15° C. in air.

The obtained product was purified by being passed through a silica gel column using dichloromethane, tetrahydrofuran, and ethanol, which are eluents, thereby obtaining Compound 1 represented by Formula 1.

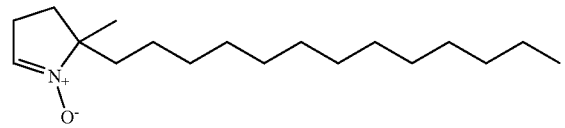 [SMILES: CCCCCCCCCCCCCC1(C)CCC=[N+]1[O-]]

Preparation of Electrolytic Solution

Production Example 2

0.5 molar (M) LiTFSI as lithium salt and 0.2M of the compound of Formula 1 obtained according to Preparation Example 1 were added to 1-ethyl-3-methyl imidazolium bis (trifluoromethylsulfonyl) imide ("EMITFSI"), thereby completing the preparation of an electrolytic solution.

Preparation Example 3

An electrolytic solution was prepared in the same manner as in Preparation Example 2, except that Compound 1 of Formula 1 obtained according to Preparation Example 1 was not used

Preparation Example 4

An electrolytic solution was prepared in the same manner as in Preparation Example 2, except that 0.2M 5,5-dimethyl-1-pyrroline N-oxide (DMPO) was used instead of Compound 1 obtained according to Preparation Example 1.

Preparation of Cathode

Preparation Example 5

A hierarchical carbon-based porous material from Cambridge Isotope Laboratory ($^{13}C$ was used), 0.5M lithium bis(trifluoromethane sulfonyl)imide ("LiTFSi") lithium salt, and 0.2M Compound 1 obtained according to Preparation Example 1 were dissolved in 1-ethyl-3-methyl imidazolium bis(trifluoromethylsulfonyl)imide ("EMITFSI") ionic liquid to obtain an ionic liquid electrolytic solution.

Glass wool was impregnated with the ionic liquid, and then, the porous material was mixed with a polyvinylidene fluoride ("PVDF") binder at a weight ratio of 90:10 and the resultant mixture was cast on a nickel mesh.

The cast porous material and the ionic liquid electrolytic solution in the glass wool were used to constitute a cathode.

Preparation Example 6

A cathode was prepared in the same manner as in Preparation Example 5, except that the electrolytic solution obtained according to Preparation Example 3 was used as an electrolytic solution.

Preparation Example 7

A cathode was prepared in the same manner as in Preparation Example 5, except that the electrolytic solution obtained according to Preparation Example 4 was used as an electrolytic solution.

Manufacturing of Lithium Air Battery

Example 1: Manufacture of Lithium Air Battery

A lithium air battery was manufactured in such a way that, as an anode, lithium metal (Li metal), which had been subjected to brushing, was attached to a copper thin film (Cu foil), and the cathode obtained according to Preparation Example 5 was placed on the anode.

Comparative Examples 1 and 2

Lithium air batteries were manufactured in the same manner as in Example 1, except that the cathodes obtained according to Preparation Example 6 and Preparation Example 7 were used.

Evaluation Example 1: Measurement of Boiling Point of Compound Prepared According to Preparation Example 1

The boiling point of Compound 1 obtained according to Preparation Example 1 was measured by differential scanning calorimetry ("DSC") and thermogravimetric analysis ("TGA").

Figure 2A:
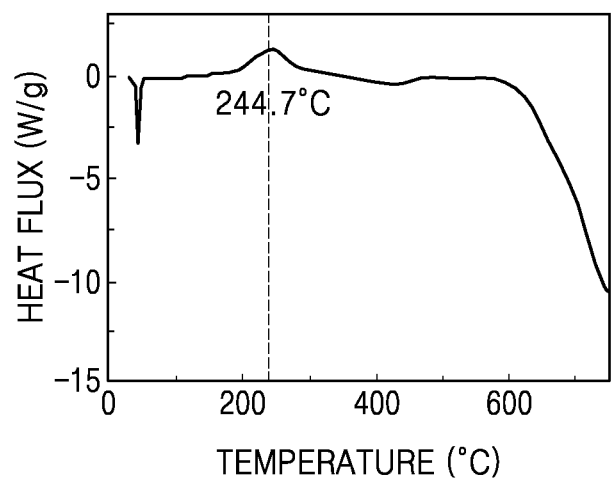
FIG. 2A is a graph of heat flux (watts per gram (W/g)) versus temperature (° C.) showing differential scanning calorimetry results.
Figure 2B:
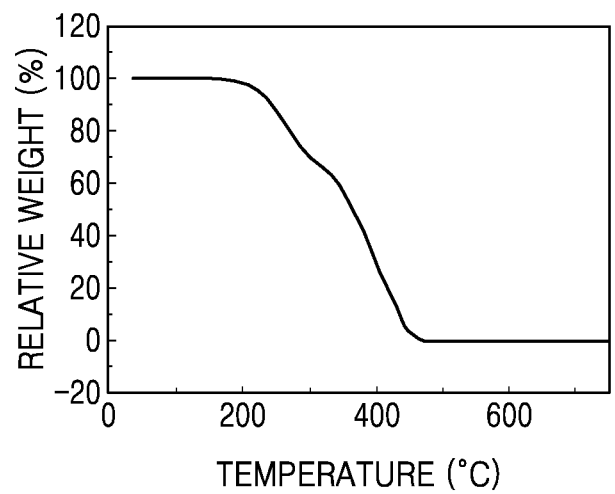
FIG. 2B is a graph of relative weight (percent (%)) versus temperature (° C.) showing thermogravimetric analysis results of an embodiment of an electrolytic additive.

As a result, as shown in FIG. 2, it seems that Compound 1 of Preparation Example 1 has a boiling point of about 244° C. Accordingly, Compound 1 is suitable for use as an electrolytic additive at high temperature (60° C. or greater).

Evaluation Example 2: Evaluation of High Temperature Charging/Discharging Characteristics The lithium air batteries manufactured according to Example 1 and Comparative Examples 1 and 2 were discharged to 2.0 volts (V) (vs. Li) at a constant current of 0.1 milliamperes per square centimeter ($mA/cm^2$) in a 1 atmosphere (atm) oxygen atmosphere at a temperature of 60° C. Then, the lithium air batteries were charged to 4.2 V with the same constant current. This cycle of charging and discharging was repeatedly performed.

Figure 3A:
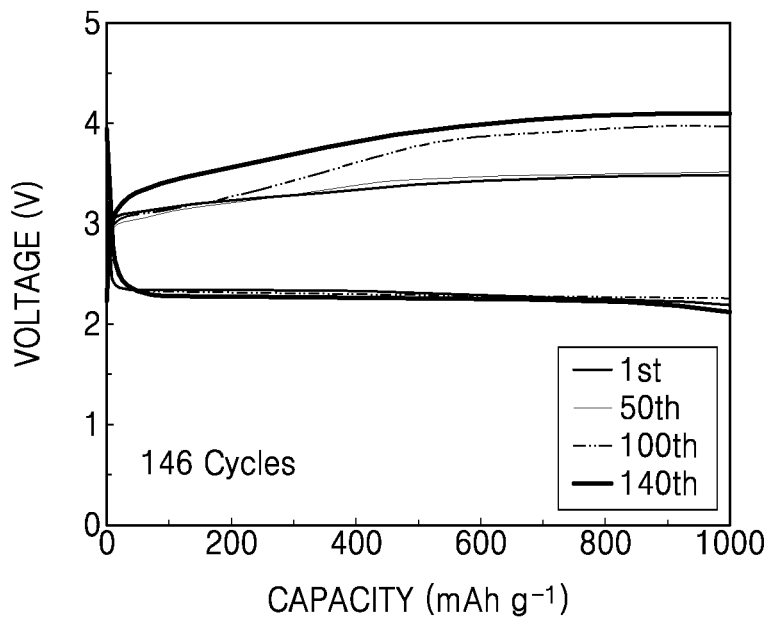
FIG. 3A is a graph of voltage (volts (V)) versus capacity (milliampere hours per gram (mAh g$^{-1}$)) showing results obtained by high-temperature charging and discharging of a lithium air battery prepared according to Example 1.
Figure 3B:
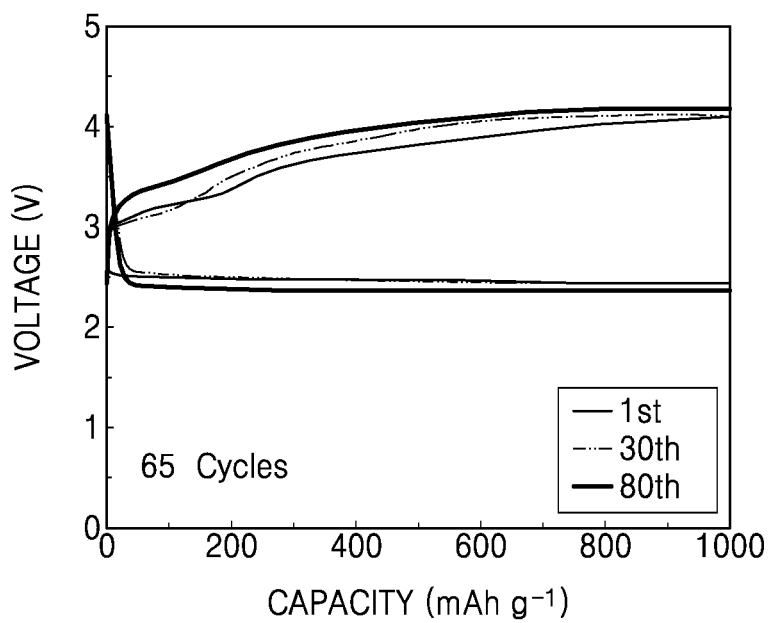
FIG. 3B is a graph of voltage (V) versus capacity (mAh g$^{-1}$) showing results obtained by high-temperature charging and discharging of a lithium air battery prepared according to Comparative Example 1.
Figure 3C:
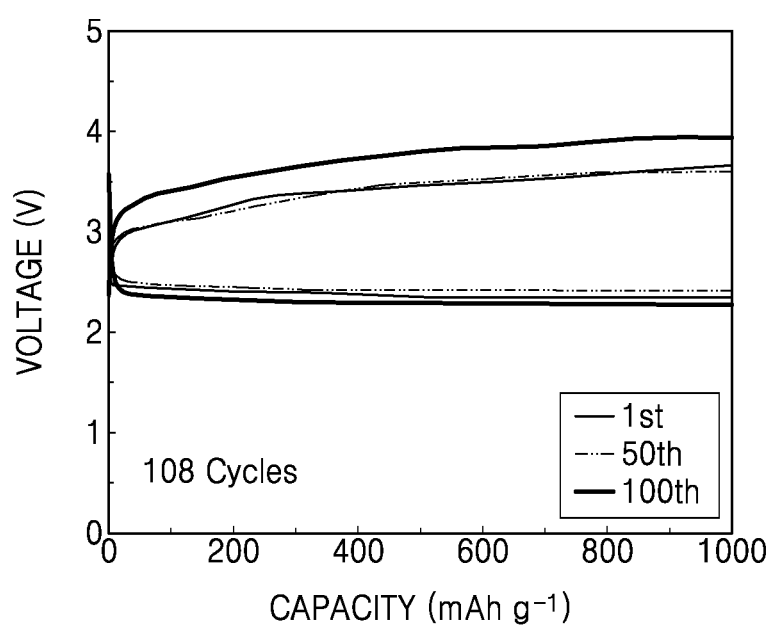
FIG. 3C is a graph of voltage (V) versus capacity (mAh g$^{-1}$) showing results obtained by high-temperature charging and discharging of a lithium air battery prepared according to Comparative Example 2.
Figure 5A:
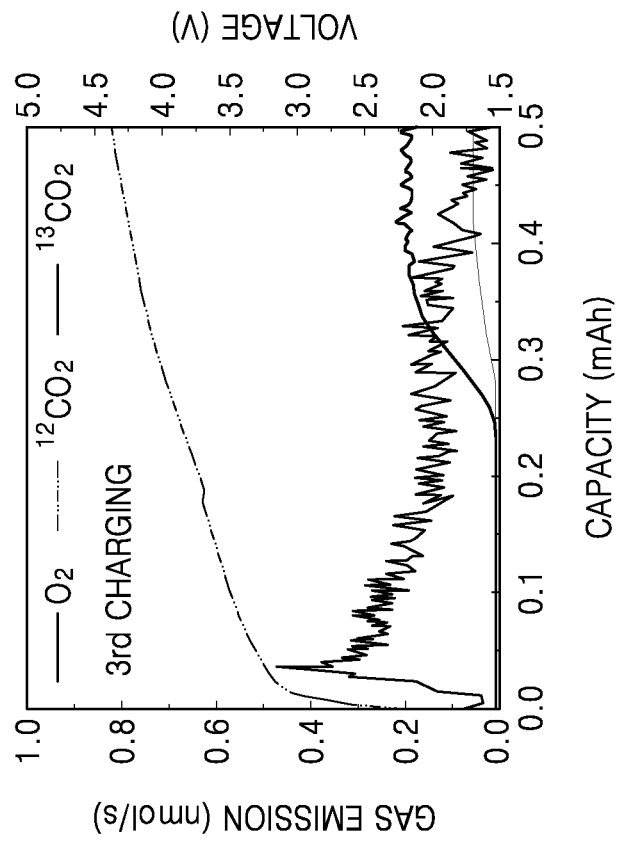
FIGS. 5A and 5B are graphs of gas emission (nmol/s) and voltage (V) versus capacity (mAh) showing the amount of $CO_2$ gas produced on the first and third charge cycles for the lithium air battery of Comparative Example 1.
Figure 5B:
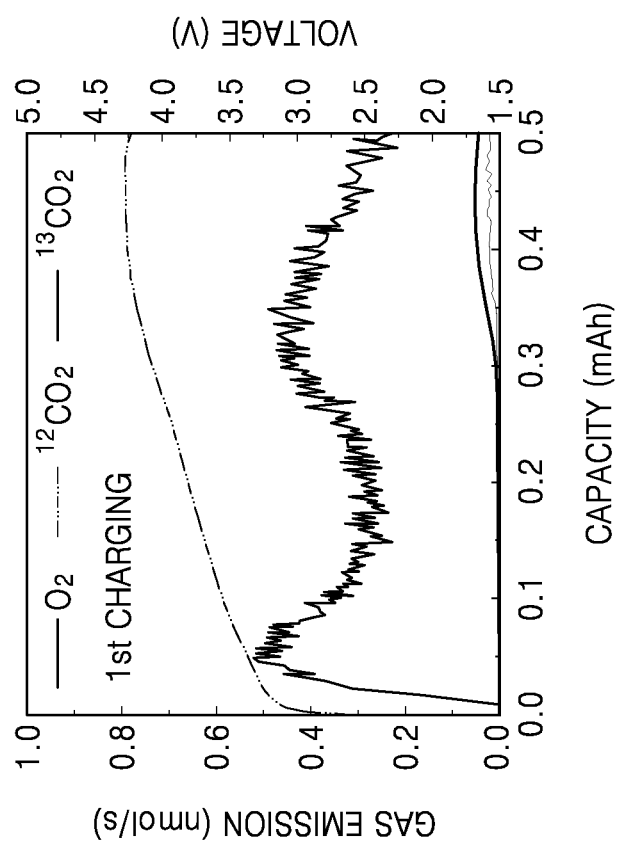

The number of cycles performed to obtain the target discharge capacity of 1,000 milliampere hours per gram of carbon (mAh/g-carbon) was measured to evaluate lifespan characteristics. Results thereof are shown in FIGS. 3A and 3B, and Table 1.

TABLE 1

|  | Cycle (times) |
| --- | --- |
| Example 1 | 146 |
| Comparative Example 1 | 65 |
| Comparative Example 2 | 108 |

As shown in Table 1, the lithium air battery of Example 1 has better lifespan characteristics than the lithium air batteries of Comparative Examples 1 and 2.

The improved lifespan characteristics of the lithium air battery of Example 1 may be due to the inclusion of Compound 1 that enables capturing of oxygen radicals at high temperature.

Evaluation Example 3: Evaluation of High Temperature Charging/Discharging Characteristics While the cycle of charging and discharging is repeatedly performed three times in which each cycle includes discharging of the lithium air batteries manufactured according to Example 1 and Comparative Examples 1 and 2 to 2.0 V (vs. Li) at a constant current of 0.1 $mA/cm^2$ in an 1 atm oxygen atmosphere at a temperature of 60° C. and then charging thereof to 4.2 V with the same constant current, the amounts of $^{12}CO_2$ and $^{13}CO_2$ with respect to O2 which was consumed in real time were analyzed by using a gas quantitative analyzer ("DEMS"). Results thereof are shown in FIGS. 4A to 4B and Table 2.

TABLE 2

|  | First charge | | | Third charge | | |
| --- | --- | --- | --- | --- | --- | --- |
|  | $O_2$ | $^{12}CO_2$ | $^{13}CO_2$ | $O_2$ | $^{12}CO_2$ | $^{13}CO_2$ |
| Example 1 | 5.179 micromoles (μmol) | 0.109 μmol | 0.122 μmol | 3.491 μmol | 0.134 μmol | 0.160 μmol |
| With respect to consumed $O_2$ (%) | — | 1.17% | 1.31% | — | 1.44% | 1.72% |
| Comparative Example 1 | 5.034 μmol | 0.115 μmol | 0.250 μmol | 2.216 μmol | 0.291 μmol | 1.116 μmol |
| With respect to consumed $O_2$ (%) | — | 1.23% | 2.68% | — | 3.12% | 11.96% |

TABLE 2-continued

| | First charge | | | Third charge | | |
|---|---|---|---|---|---|---|
| | $O_2$ | $^{12}CO_2$ | $^{13}CO_2$ | $O_2$ | $^{12}CO_2$ | $^{13}CO_2$ |
| Comparative Example 2 | 5.274 μmol | 0.051 μmol | 0.066 μmol | 2.522 μmol | 0.215 μmol | 0.278 μmol |
| With respect to consumed $O_2$ (%) | — | 0.55% | 0.71% | — | 2.30% | 2.98% |

In the case of the lithium air battery of Example 1, during the first and third charging, the amount of $^{13}CO_2$ was increased about 1.3 times from 1.31% to 1.72%. In the case of the lithium air battery of Comparative Example 1, the amount $^{13}CO_2$ was increased about 4.2 times from 2.68% to 11.96%, and in the case of the lithium air battery of Comparative Example 2, the amount $^{13}CO_2$ was increased about 4.5 times from 0.71% to 2.98%.

As seen above, the amount $^{13}CO_2$ of the lithium air battery of Example 1 was not substantially increased compared to that of the lithium air batteries of Comparative Examples 1 and 2. This is because the electrolytic additive of Compound 1 retains its function of capturing oxygen radicals even at high temperature. In the case of Comparative Examples 1 and 2, the generation of oxygen radicals during high-temperature charging was not controlled. Accordingly, a cathode deteriorates and thus, the amount $^{13}CO_2$ was rapidly increased.

Regarding a lithium air battery including an electrolytic solution having an electrolytic additive, the electrolytic additive reacts preferably with radicals generated at a cathode, and thus, a side reaction is suppressed and lifespan characteristics of the lithium air battery are improved.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electrolytic additive comprising a compound represented by Formula 1:

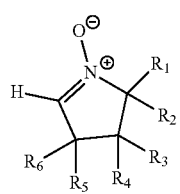

Formula 1 wherein, in Formula 1,
$R_1$ and $R_2$ are each independently hydrogen or a substituted or unsubstituted $C_1$-$C_{20}$ aliphatic hydrocarbon group, and at least one of $R_1$ and $R_2$ is a substituted or unsubstituted $C_2$-$C_{20}$ alkyl group, and
$R_3$ to $R_6$ are each independently hydrogen, a substituted or unsubstituted $C_1$-$C_{20}$ alkyl group, or a substituted or unsubstituted $C_5$-$C_{20}$ cycloalkyl group.

2. The electrolytic additive of claim 1, wherein in Formula 1,
$R_1$ is a methyl group, an ethyl group, a propyl group, an isopropyl group, an n-butyl group, an isobutyl group, a tert-butyl group, or a sec-butyl group, and
$R_2$ is a substituted or unsubstituted $C_2$-$C_{20}$ alkyl group.

3. The electrolytic additive of claim 1, wherein
$R_1$ is a methyl group,
$R_2$ is a substituted or unsubstituted $C_5$-$C_{20}$ alkyl group, and
the compound represented by Formula 1 has a boiling point of 100° C. or greater.

4. The electrolytic additive of claim 1, wherein Formula 1 is represented by Formula 1-1:

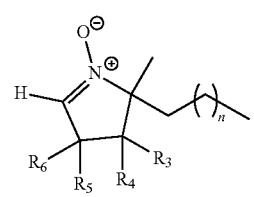

Formula 1-1 wherein, in Formula 1-1,
$R_3$ to $R_6$ are each independently hydrogen, a substituted or unsubstituted $C_1$-$C_{20}$ alkyl group, or a substituted or unsubstituted $C_5$-$C_{20}$ cycloalkyl group, and
n is an integer from 3 to 18.

5. An electrolytic solution for a secondary battery, the electrolytic solution comprising:
a lithium salt;
a solvent comprising an organic solvent, an ionic liquid, or a combination thereof; and
the electrolytic additive according to claim 1.

6. The electrolytic solution of claim 5, wherein the lithium salt is $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ wherein each of x and y is a natural number, LiCl, LiI, or a combination thereof.

7. The electrolytic solution of claim 5, wherein a concentration of the lithium salt in the electrolytic solution is about 0.01 molar to about 2 molar.

8. The electrolytic solution of claim 5, wherein the organic solvent comprises an ether, a carbonate, an ester, a ketone, or a combination thereof.

9. The electrolytic solution of claim 8, wherein the ether comprises a cyclic ether.

10. The electrolytic solution of claim 8, wherein the ether comprises 1,2-dimethoxyethane, 1,2-diethoxyethane, 1,2-dibutoxyethane, dimethyl ether, diethyl ether, dibutyl ether, diethylene glycol dimethyl ether, diethylene glycol diethyl ether, triethylene glycol dimethyl ether, triethylene glycol diethyl ether, tetraethylene glycol dimethyl ether, tetraethylene glycol diethyl ether, dimethyl sulfoxide, N,N-dimethyl acetamide, or a combination thereof.

11. The electrolytic solution of claim 9, wherein the cyclic ether comprises 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyl tetrahydrofuran, 2,5-dimethyl tetrahydrofuran, 2,5-dimethoxy tetrahydrofuran, 2-ethoxy tetrahydrofuran, 2-methoxy-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, isosorbide dimethyl ether, or a combination thereof.

12. The electrolytic solution of claim 5, wherein the ionic liquid comprises:
- a cation comprising an ammonium cation, an imidazolium cation, a piperidinium cation, a pyridinium, pyrrolidinium cation, a phosphonium cation, a sulfonium cation, or a combination thereof, and
- an anion comprising a bis(trifluoromethylsulfonyl)imide anion, a bromide anion, a chloride anion, a dicyanamide anion, a hexafluorophosphate anion, a phosphate anion, a sulfate anion, an iodide anion, a sulfonate anion, a nitrate anion, a tetrafluoroborate anion, a thiocyanate anion, a triflate anion, or a combination thereof.

13. The electrolytic solution of claim 5, wherein a concentration of the electrolytic additive in the electrolytic solution is about 0.01 molar to about 2 molar.

14. A cathode comprising the electrolytic additive of claim 1.

15. The cathode of claim 14, further comprising a porous material and an electrolyte layer comprising an electrolytic solution, wherein the electrolytic solution comprises the electrolytic additive.

16. The cathode of claim 15, wherein a concentration of the electrolytic additive in the electrolytic solution for a cathode is about 0.1 molar to about 1 molar.

17. The cathode of claim 14, wherein the cathode comprises a porous material, and a coating layer on the porous material, wherein the coating layer comprises the electrolytic additive.

18. A lithium air battery comprising:
the cathode of claim 14; and
an anode.

19. The lithium air battery of claim 18, wherein the anode comprises lithium metal.

20. The electrolytic solution of claim 5, wherein the ionic liquid comprises 1-ethyl-3-methylimidazolium bis(trifluoromethylsulfonyl)imide, diethylmethylammonium trifluoromethanesulfonate, dimethylpropylammonium trifluoromethanesulfonate, diethylmethylammonium trifluoromethanesulfonylimide, methylpropylpiperidinium trifluoromethanesulfonylimide, or a combination thereof.

* * * * *